United States Patent
Pohanka

(10) Patent No.: US 9,073,509 B2
(45) Date of Patent: Jul. 7, 2015

(54) STEERING APPARATUS FOR A MOTOR VEHICLE

(71) Applicant: Dr. Ing. h.c. F. Porsche Aktiengesellschaft, Stuttgart (DE)

(72) Inventor: Martin Pohanka, Stuttgart (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 0 days.

(21) Appl. No.: 14/470,242

(22) Filed: Aug. 27, 2014

(65) Prior Publication Data

US 2015/0061264 A1 Mar. 5, 2015

(30) Foreign Application Priority Data

Aug. 28, 2013 (DE) .......................... 10 2013 109 328

(51) Int. Cl.
*B62D 1/04* (2006.01)
*B60R 21/203* (2006.01)
*B60R 21/2165* (2011.01)

(52) U.S. Cl.
CPC .......... *B60R 21/21658* (2013.01); *B62D 1/046* (2013.01)

(58) Field of Classification Search
CPC ............ B60R 21/21658; B60R 21/203; B60R 21/2032; B60R 21/2035; B62D 1/046; B62D 1/12
See application file for complete search history.

(56) References Cited

U.S. PATENT DOCUMENTS

| | | | | |
|---|---|---|---|---|
| D138,079 S | * | 6/1944 | Drew | D12/175 |
| D221,070 S | * | 7/1971 | Munter et al. | D12/175 |
| D226,575 S | * | 3/1973 | Ferdandez et al. | D15/18 |
| 3,726,152 A | * | 4/1973 | Tsuneizumi | 74/552 |
| 4,938,504 A | * | 7/1990 | Fukuda et al. | 280/731 |
| 4,974,873 A | * | 12/1990 | Kaiguchi et al. | 280/735 |
| 5,280,949 A | * | 1/1994 | Manabe | 280/731 |
| 5,356,173 A | * | 10/1994 | Hongou et al. | 280/728.2 |
| 5,577,768 A | * | 11/1996 | Taguchi et al. | 280/735 |
| 5,697,638 A | * | 12/1997 | Port | 280/731 |
| 5,716,068 A | * | 2/1998 | Sahara et al. | 280/731 |
| 6,079,736 A | * | 6/2000 | Koide | 280/731 |
| 6,125,716 A | * | 10/2000 | Hosoi et al. | 74/552 |
| 6,224,093 B1 | * | 5/2001 | Ochiai et al. | 280/731 |
| 6,227,327 B1 | * | 5/2001 | Nigrin et al. | 180/402 |
| 6,938,720 B2 | * | 9/2005 | Menjak et al. | 180/402 |
| 7,278,510 B1 | * | 10/2007 | Richards | 180/336 |
| 7,441,799 B2 | * | 10/2008 | Enders et al. | 280/731 |
| 8,079,615 B2 | * | 12/2011 | Tanaka | 280/743.2 |
| 2003/0023353 A1 | * | 1/2003 | Badarneh | 701/1 |
| 2007/0193814 A1 | * | 8/2007 | Dupont et al. | 180/333 |
| 2008/0190681 A1 | * | 8/2008 | Mayser et al. | 180/170 |
| 2010/0200375 A1 | * | 8/2010 | Han et al. | 200/61.54 |

FOREIGN PATENT DOCUMENTS

EP 2374690 A1 10/2011

* cited by examiner

*Primary Examiner* — Drew Brown
(74) *Attorney, Agent, or Firm* — RatnerPrestia

(57) ABSTRACT

The steering apparatus includes a steering handle which is in the form of a greatly reduced, skeleton-like so-called horned steering wheel without a continuous steering wheel rim. The steering handle is fastened to an airbag module by fasteners that taper in a V-shape.

6 Claims, 4 Drawing Sheets

STEERING APPARATUS FOR A MOTOR VEHICLE

CROSS-REFERENCE TO RELATED APPLICATIONS

This application claims priority to German Patent Application No. DE 10 2013 109 328.0, filed Aug. 28, 2013, which is incorporated by reference herein in its entirety.

FIELD OF THE INVENTION

The invention relates to a steering apparatus for a motor vehicle.

BACKGROUND OF THE INVENTION

EP 2 374 690 A1, which is incorporated by reference herein, has disclosed a steering apparatus having a steering handle which comprises two hand grips of curved form which are connected to one another, to form a partially circular steering handle, by means of a lower connecting element. Two shift paddles are provided on the steering handle, close to the hand grips.

SUMMARY OF THE INVENTION

Described herein is a steering apparatus for a motor vehicle having a steering handle which has two hand grips of curved form, a so-called horned steering handle, which can be mounted on an airbag module in a simple manner.

The steering apparatus has a steering handle which comprises two opposite hand grips of curved form and in which there is arranged an airbag module, wherein the steering handle is composed of a skeleton-like steering handle structure and comprises shift paddles and rotary switches arranged to both sides of the airbag module, and the steering handle can be mounted on the airbag module by means of two screws in a V-shaped orientation, which screws extend downward to both sides of the airbag module when the steering handle is in an installed position.

An advantage achieved by means of the invention consist in that a skeleton-like steering handle structure with switch elements can be fixed to the airbag module by way of fastening means which can be installed in an easily accessible manner. For this purpose, it is provided, according to aspects of the invention, that the steering handle comprises a skeleton-like steering handle structure and has shift paddles and rotary switches arranged on the steering handle structure to both sides of the airbag module, which steering handle structure can be mounted on the airbag module by means of two screws in a V-shaped orientation, which screws extend downward to both sides of the airbag module when the steering handle is in an installed position.

In particular, it is provided, according to aspects of the invention, that the rotary switches are integrated into the steering handle structure and the shift paddles are arranged behind the rotary switches as viewed in relation to the front side of the steering handle. The steering handle structure comprises frame elements which are arranged to both sides of the airbag module and which are provided with an approximately rectangular or square opening and which are connected, below the airbag module, by means of a transverse web.

The frame elements of the steering handle structure each have an outer holding strip, which is connected to the hand grips, and a respectively opposite inner frame strip, which is connected to integrally formed transverse webs of the airbag module. By means of this design of the skeleton-like steering handle structure with two interconnected frame elements and the integrated holding and frame strips, a steering apparatus with two hand grips is provided which can be mounted on the airbag module in a stable manner by means of the two screws.

It is also provided, according to aspects of the invention, that the inner frame strips of the steering handle structure are in a V-shaped orientation, and the screws which likewise run in a V-shape relative to these extend, from above, downward through an upper half of the frame elements and into the transverse webs of the airbag module and can preferably be fixed therein. The steering handle structure or the steering handle is thus fastened to the airbag module by means of the screws.

BRIEF DESCRIPTION OF THE DRAWINGS

An exemplary embodiment of the invention is illustrated in the drawings and will be described in more detail below.

In the drawing.

DETAILED DESCRIPTION OF THE INVENTION

Figure 1:
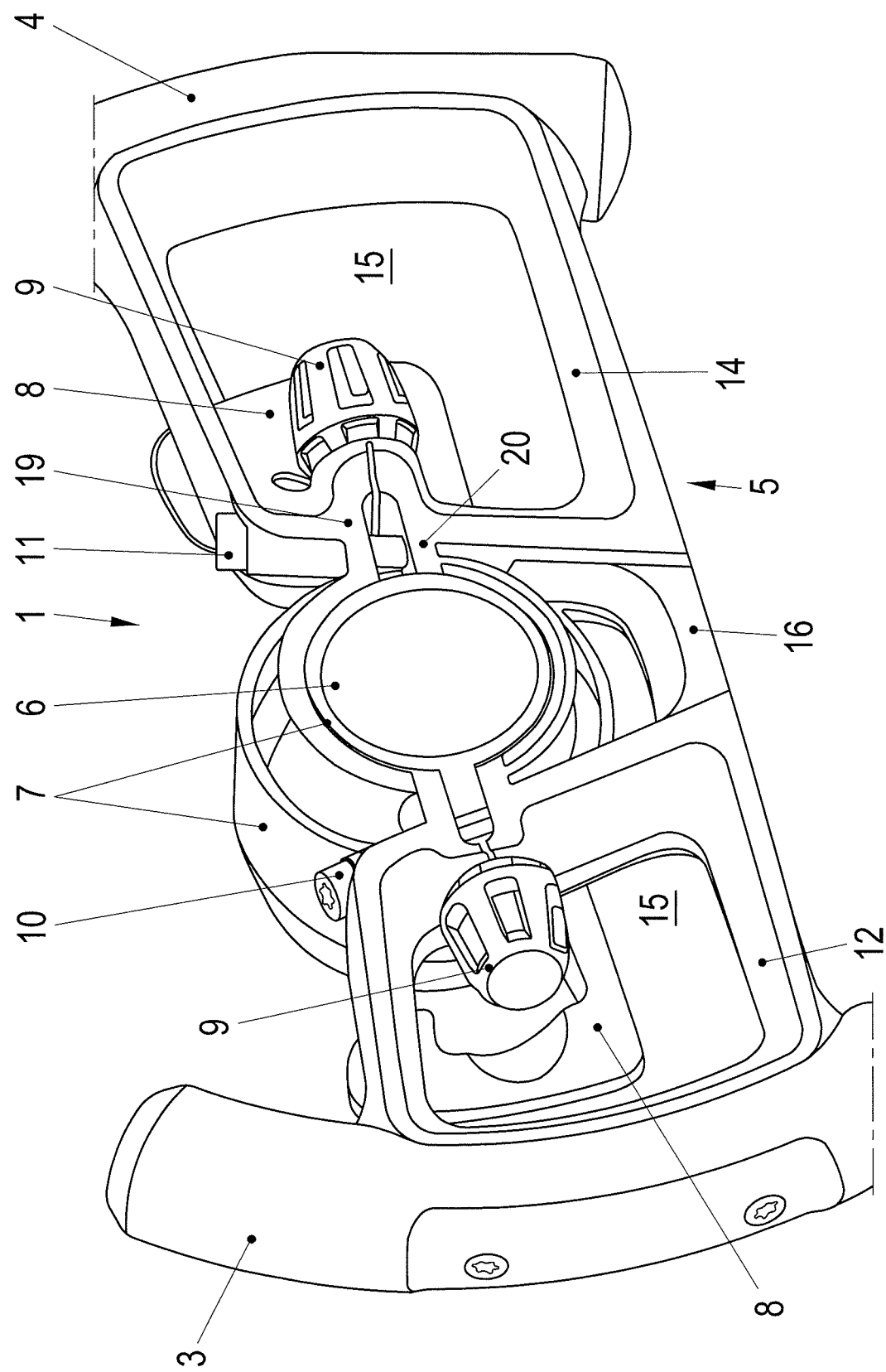
FIG. 1 is a diagrammatic illustration of a steering apparatus having a skeleton-like steering handle structure and a mounted state on an airbag module.
Figure 2:
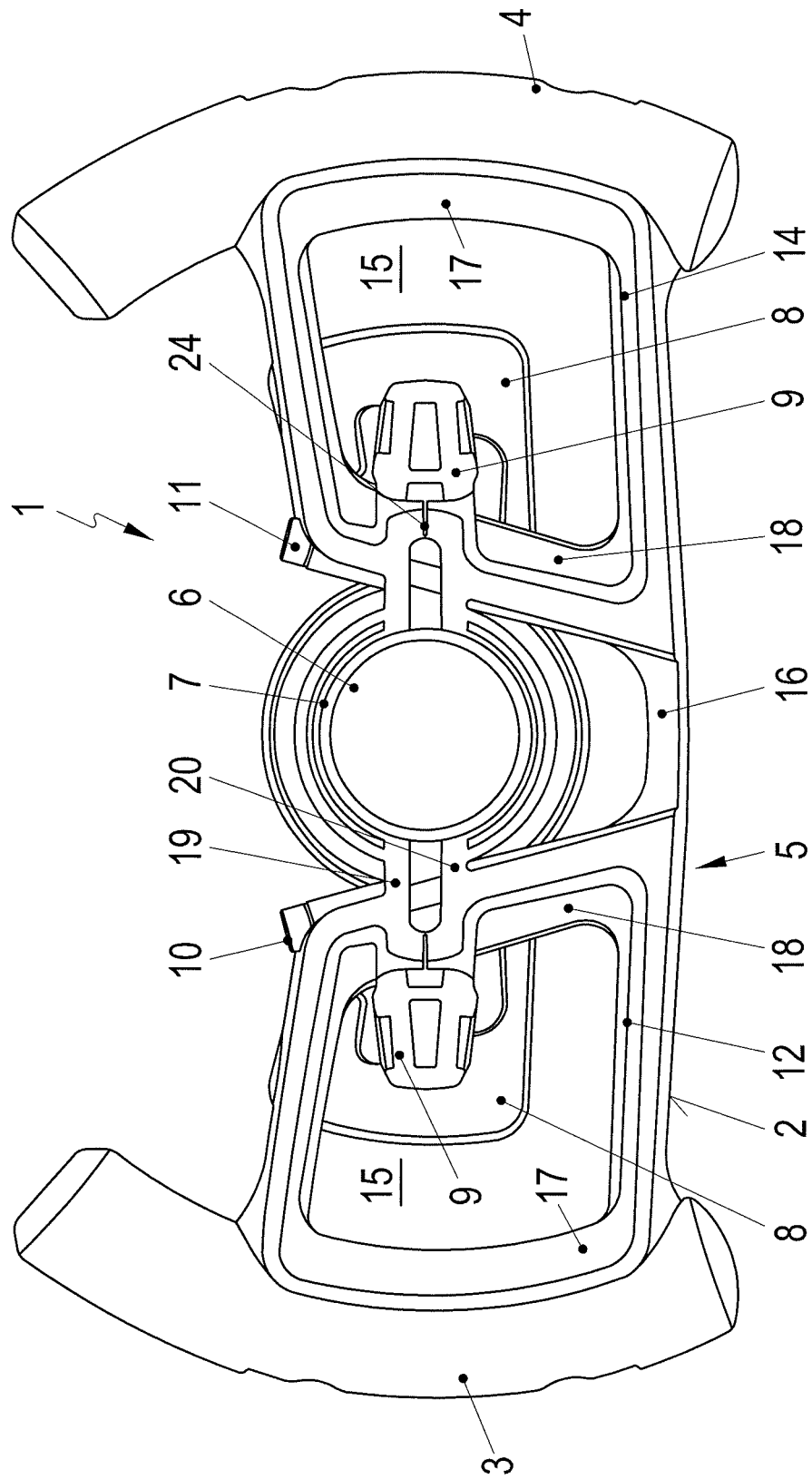
FIG. 2 shows a front view of the steering handle as per FIG. 1.
Figure 3:
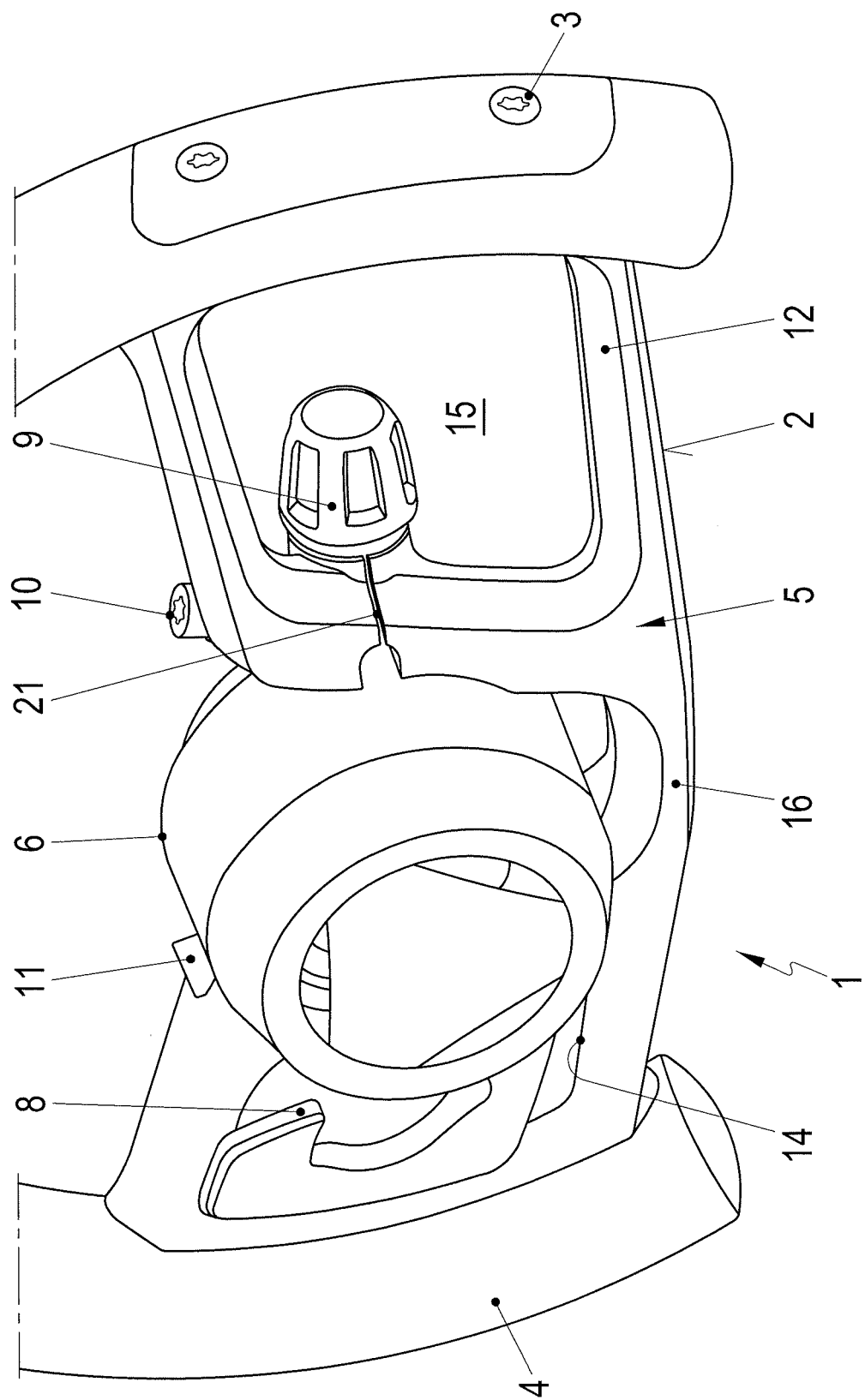
FIG. 3 shows a rear view of the steering handle as per FIG. 2.
Figure 4:
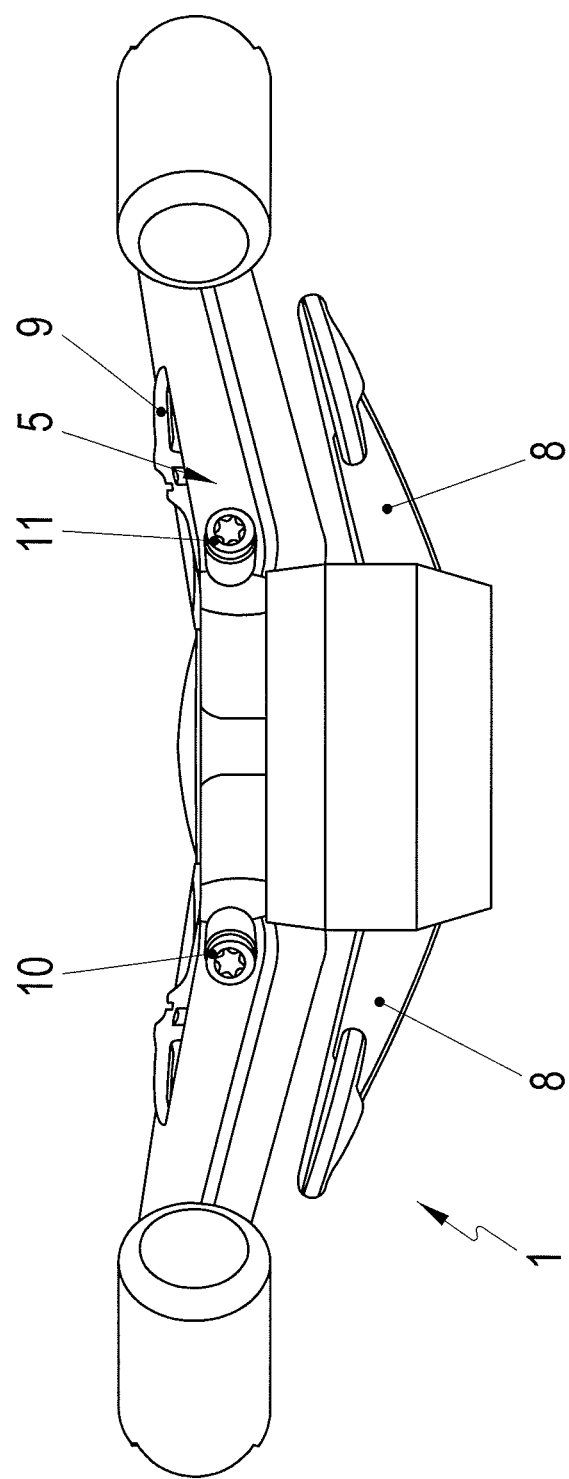
FIG. 4 shows a view from above of the steering handle as per FIG. 2.

A steering apparatus 1 for a motor vehicle substantially comprises a steering handle 2 with two opposite hand grips 3, 4 which are of curved form and which are connected to a skeleton-like steering handle structure 5. An airbag module 6 is arranged in a housing 7 centrally in said steering handle structure.

Arranged to both sides of the airbag module 6 are so-called shift paddles 8 and rotary switches 9, for example for controlling windshield wipers and other vehicle modes (comfort, sport, economy), wherein the rotary switches 9 are held in the steering handle structure 5.

The steering handle structure 5 can be mounted on the airbag module 6 by means of two screws 10, 11 which are in a V-shaped orientation and which extend downward to both sides of the airbag module 6 when the steering handle 2 is in an installed position.

The rotary switches 9 are held in receptacles of the steering handle structure 5 and are arranged in front of the shift paddles 8 as viewed from the front side of the steering handle 2.

The skeleton-like steering handle structure 5 has approximately square or rectangular frame elements 12, 14 which are arranged to both sides of the airbag module 6 and which have an opening 15 and which are connected to one another, below, by means of a transverse web 16.

The frame elements 12, 14 of the structure 5 each have an outer holding strip 17, said outer holding strips being connected to the hand grips 3, 4 of the steering handle 2. Arranged opposite said holding strip 17 is a frame strip 18, said frame strips being connected to transverse webs 19, 20 of the airbag module 6.

The transverse webs 19, 20 of the airbag module 6 are arranged one above the other with a spacing and have, on the ends, a parting slot 21 that can be clamped during the fastening process.

The inner frame strips 18 of the steering handle structure 5 are oriented in a V-shape with respect to one another, and the screws 10, 11 run correspondingly to this. The screws 10, 11 extend, from above, downward through an upper half of the frame element 12, 14 of the steering handle structure 5 and into the transverse webs 19, 20 of the airbag module 6, and are preferably fixed therein, such that the steering handle 2 can be mounted on the airbag module 6 by means of the screws 10, 11 that taper in a V-shape.

What is claimed is:

1. A steering apparatus for a motor vehicle, having a steering handle which comprises two opposite hand grips of curved form and in which there is arranged an airbag module, wherein the steering handle is composed of a steering handle structure and comprises shift paddles and rotary switches arranged to both sides of the airbag module, and the steering handle is configured to be mounted on the airbag module by means of two fasteners in a V-shaped orientation, which fasteners extend downward to both sides of the airbag module when the steering handle is in an installed position,
    wherein the steering handle structure comprises frame elements which are arranged on both sides of the airbag module and which are each provided with an approximately rectangular or square opening and which are connected below the airbag module, by a transverse web, and
    wherein the frame elements of the steering handle structure each comprise an outer holding strip, which is connected to the hand grips, and a respectively opposite inner frame strip, which is connected to integrally formed transverse webs of the airbag module.

2. The steering apparatus as claimed in claim 1, wherein the rotary switches are integrated into the steering handle structure and the shift paddles are arranged behind the rotary switches as viewed in relation to a front side of the steering wheel.

3. The steering apparatus as claimed in claim 1, wherein the transverse webs are arranged on the airbag module one above the other and with a spacing with respect to one another and are provided, on the ends, with a parting slot that is configured to be clamped.

4. The steering apparatus as claimed in claim 1, wherein the inner frame strips of the steering handle structure are in a V-shaped orientation, and the fasteners which run in a V-shape relative to the inner frame strips extend, from above, downward through an upper half of the frame elements and into the transverse webs of the airbag module and are configured to be fixed into the transverse webs.

5. A steering apparatus for a motor vehicle, having a steering handle which comprises two opposite hand grips of curved form and in which there is arranged an airbag module, wherein the steering handle is composed of a steering handle structure and comprises shift paddles and rotary switches arranged to both sides of the airbag module, and the steering handle is configured to be mounted on the airbag module by means of two fasteners in a V-shaped orientation, which fasteners extend downward to both sides of the airbag module when the steering handle is in an installed position, wherein the steering handle structure comprises frame elements which are arranged on both sides of the airbag module and which are each provided with an opening and wherein each rotary switch extends into one of the openings.

6. A steering apparatus for a motor vehicle, having a steering handle which comprises two opposite hand grips of curved form and in which there is arranged an airbag module, wherein the steering handle is composed of a steering handle structure and comprises shift paddles and rotary switches arranged to both sides of the airbag module, and the steering handle is configured to be mounted on the airbag module by means of two fasteners in a V-shaped orientation, which fasteners extend downward to both sides of the airbag module when the steering handle is in an installed position, wherein heads of the fasteners are both visible and accessible at a top end of the steering apparatus.

\* \* \* \* \*